S. C. BARR.
VENDING MACHINE.
APPLICATION FILED MAY 2, 1921.
1,416,159.
Patented May 16, 1922.
8 SHEETS—SHEET 5.
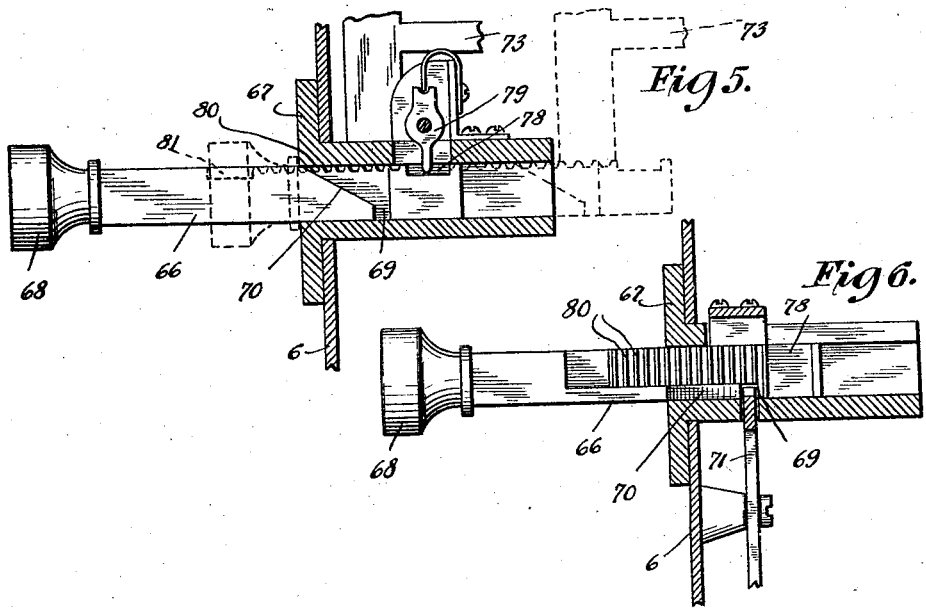
Fig 5.
Fig 6.
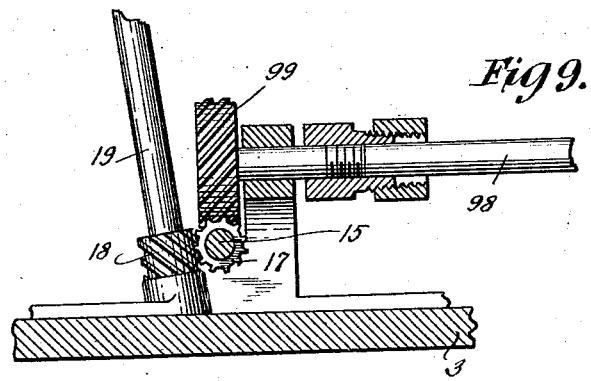
Fig 9.
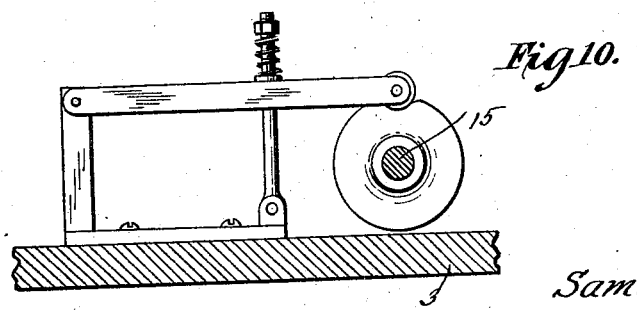
Fig 10.
Inventor
Samuel C. Barr
Witness
By C. C. Shepherd
Attorney

S. C. BARR.
VENDING MACHINE.
APPLICATION FILED MAY 2, 1921.

1,416,159.

Patented May 16, 1922.
8 SHEETS—SHEET 6.

Inventor
Samuel C. Barr

Witness

By C. C. Shepherd
Attorney

S. C. BARR.
VENDING MACHINE.
APPLICATION FILED MAY 2, 1921.

1,416,159.

Patented May 16, 1922.
8 SHEETS—SHEET 7.

Inventor
Samuel C. Barr

By C. C. Shepherd
Attorney

S. C. BARR.
VENDING MACHINE.
APPLICATION FILED MAY 2, 1921.

1,416,159.  Patented May 16, 1922.
8 SHEETS—SHEET 8.

Inventor
Samuel C. Barr

Witness

By
C. C. Shepherd.

Attorney

UNITED STATES PATENT OFFICE.

SAMUEL C. BARR, OF CHILLICOTHE, OHIO.

VENDING MACHINE.

1,416,159.   Specification of Letters Patent.   Patented May 16, 1922.

Application filed May 2, 1921. Serial No. 466,283.

*To all whom it may concern:*

Be it known that SAMUEL C. BARR, a citizen of the United States, residing at Chillicothe, in the county of Ross and State of Ohio, has invented certain new and useful Improvements in Vending Machines, of which the following is a specification.

This invention relates to an improved automatic vending machine, primarily adapted for the purpose of dispensing eye glasses, spectacles, lenses and other optical equipment, the primary object of the invention being to produce a simple and effective machine wherein a novel correlation of elements exists for the purpose of enabling a patron to first select lenses which will be best adapted for individual requirements and after making the selection, and by the deposit of a proper coin or coins, to effect the operation of the dispensing mechanism of the machine in order that the desired glasses may be obtained.

Another object of the invention resides particularly in improving the apparatus and construction disclosed in my prior Patents, Numbers 1,266,090, 1,282,727 and 1,345,573 and issued May 14, 1918, Oct. 29, 1918 and July 6, 1920 respectively, by providing a machine wherein a common actuating device is provided for effecting the operation of the eye testing mechanism, the vending mechanism and the frame fitting mechanism, in order that the apparatus will be simplified in construction and rendered more convenient to operate, furthermore, the construction being such that when a desired pair of lenses has been ascertained by the operation of the eye testing mechanism, the vending mechanism will be automatically positioned in readiness, upon the deposit of a coin, to eject the selected glasses from the vending mechanism and into a discharge chute, thus eliminating the necessity of separately operating the said mechanisms, as is the case in my prior apparatus.

With these and other objects in view, as will appear as the description proceeds, the invention accordingly consists in the novel features of construction, combinations of elements and arrangements of parts, hereinafter to be fully described and pointed out in the appended claims.

In the accompanying drawings, forming a part of this specification, and in which similar characters of reference denote like and corresponding parts:

Figure 5 is a detail vertical sectional view disclosing the construction of the plunger controlling mechanism.

Figure 6 is a detail horizontal sectional view of said plunger controlling mechanism.

Figure 9 is a detail sectional view disclosing the worm gear construction for effecting the operation of the eye testing and frame fitting and vending mechanisms.

Figure 10 is a detail view disclosing the mechanism for maintaining the various parts of the apparatus in a normal position.

Figure 1:
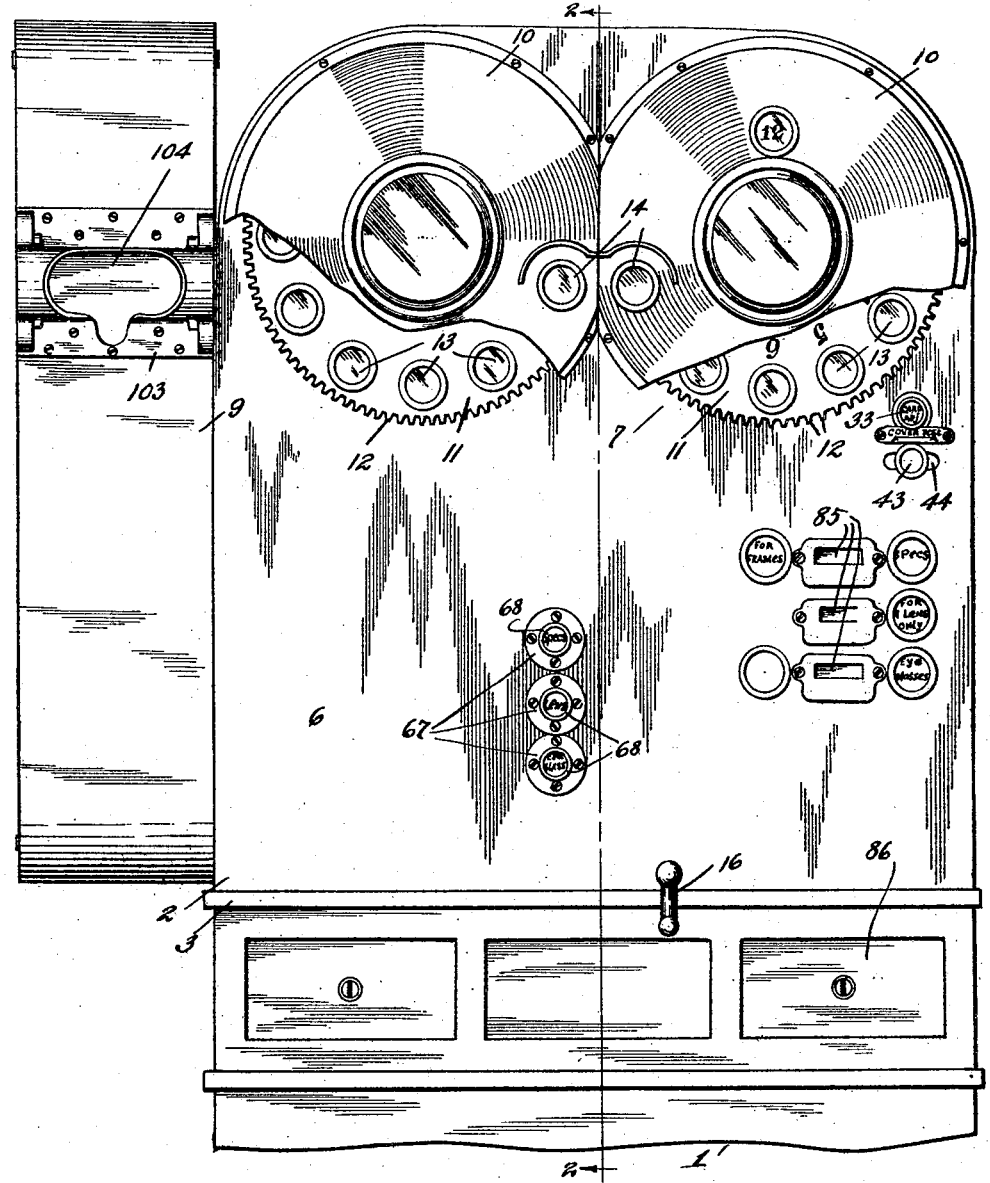
Figure 1 is a front elevation of the vending machine comprising the present invention.
Figure 2:
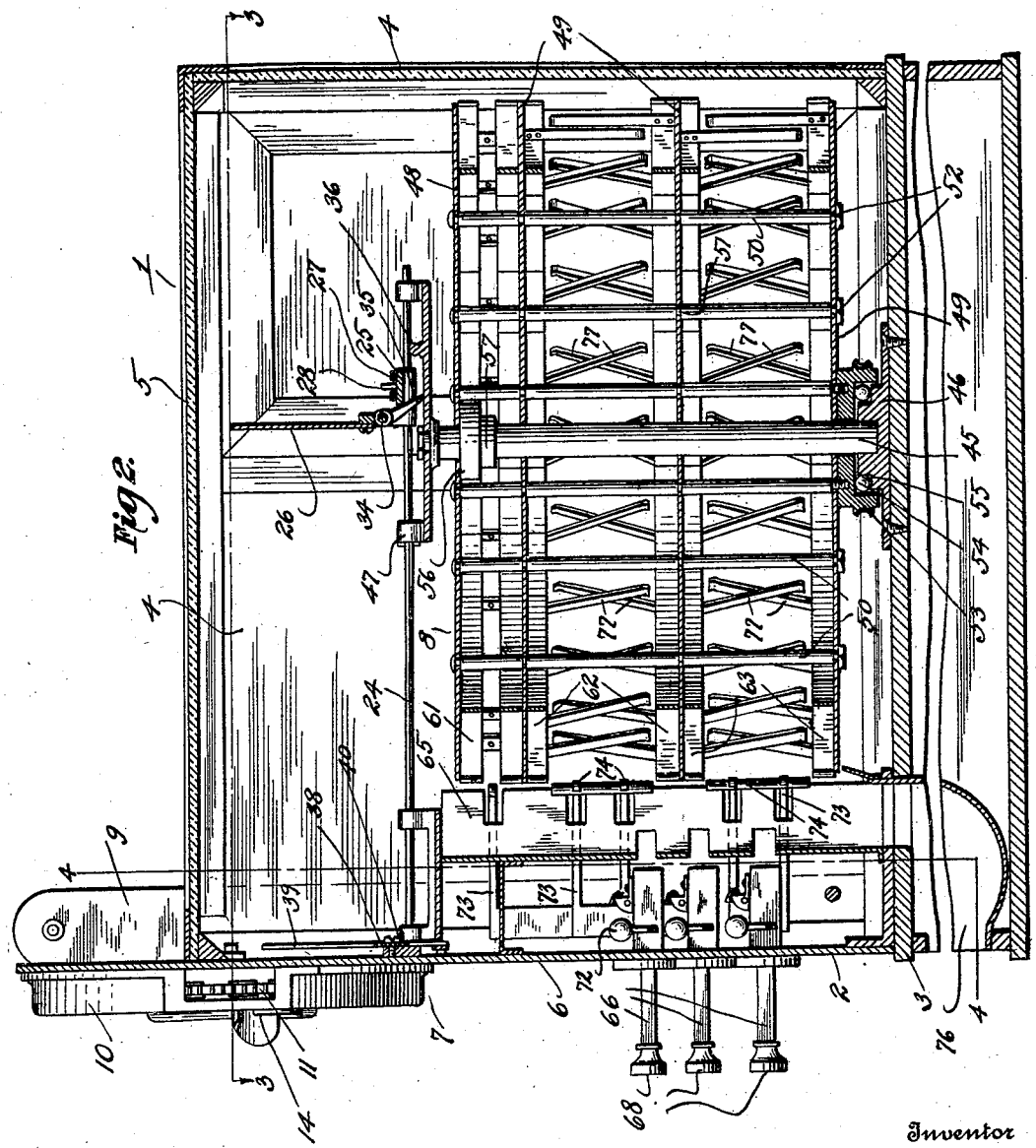
Figure 2 is a vertical, longitudinal section taken through the machine on the plane disclosed by the line 2—2 of Figure 1.

Referring more particularly to the drawings, the numeral 1 designates my improved vending machine in its entirety. As shown, this machine is formed to include a cabinet 2, which is formed to provide a suitably supported base 3, transparent side and rear walls 4, a top 5 and a front wall 6. This cabinet is adapted to include in connection therewith an eye testing mechanism 7, a vending mechanism 8, and a frame testing mechanism 9, all of which are cooperatively related and are mutually dependent in effecting and carrying out the principles and aims of the invention.

In describing the machine in its order of operation, attention is first directed to the construction of the eye testing mechanism 7, which is utilized for the purpose if enabling the patrons of the machine to select lenses which will best conform to their particular optical requirements. In enabling the patron to individually test the eyes, without requiring the services of an optician, the front wall 6 is provided contiguous to its upper portion with a pair of circular casings 10, in which are rotatably mounted upon horizontal axis lens holding disks 11. These disks, as shown in Figure 1, are provided with peripheral gear teeth 12, which intermesh so that said disks will be rotated in unison and to the same extent when rotative power is applied to either thereof. Fitted circumferentially within the disks and situated concentrically of the axis thereof are eye glass lenses 13 of varying optical properties, and of sufficient number to permit the same to answer the requirements of a purchaser, and to answer such requirements satisfactorily. The casings 10 are provided with adjacent sight openings 14 into registry with which the said disks 11 are adapted to be rotated so that the lenses 13 thereof will be brought into alignment with the openings 14 to permit the patron to see through the lenses into the interior of the cabinet 2, in which provision is made to enable the lenses to be tested.

In this particular machine the disks 11 are rotated by means of an actuating shaft 15, which extends horizontally through the cabinet and may be supported by bearings provided in conjunction with the front wall 6 and the base 3, the said shaft being manually rotated in this instance by a crank 16, or any other equivalent device. As disclosed in Figure 9, the said shaft 15 is provided with a spiral gear 17, which is situated so as to mesh with a similar gear 18 provided upon a substantially vertically extending shaft 19. The latter shaft extends upwardly in parallelism with and immediately to the rear of the wall 6 and is suitably mounted for rotation in bearings 20, the upper end thereof being equipped with a worm gear 20′, which meshes with a gear 21 fixed to one of the axle shafts 22 of the disks 11. Manifestly, by rotating the shaft 15, motion will be imparted positively and silently to the disks 11 so that the latter may have the various lenses thereof brought into testing registration with the sight openings provided in the casings 10 and with similar openings 23 provided in the front wall 6. By this construction, the disks may be conveniently rotated and locked against movement in their various adjusted positions by means of the particular type of gearing employed. Moreover, when a certain pair of lenses has been brought into registration with the openings 14, vision through the lenses may be obtained by reason of the openings 23, so that the patron may see into the interior of the cabinet, a condition which may be readily effected by the transparent walls of the cabinet, or if desired by means of an artificial illuminate situated within the cabinet.

Figure 3:
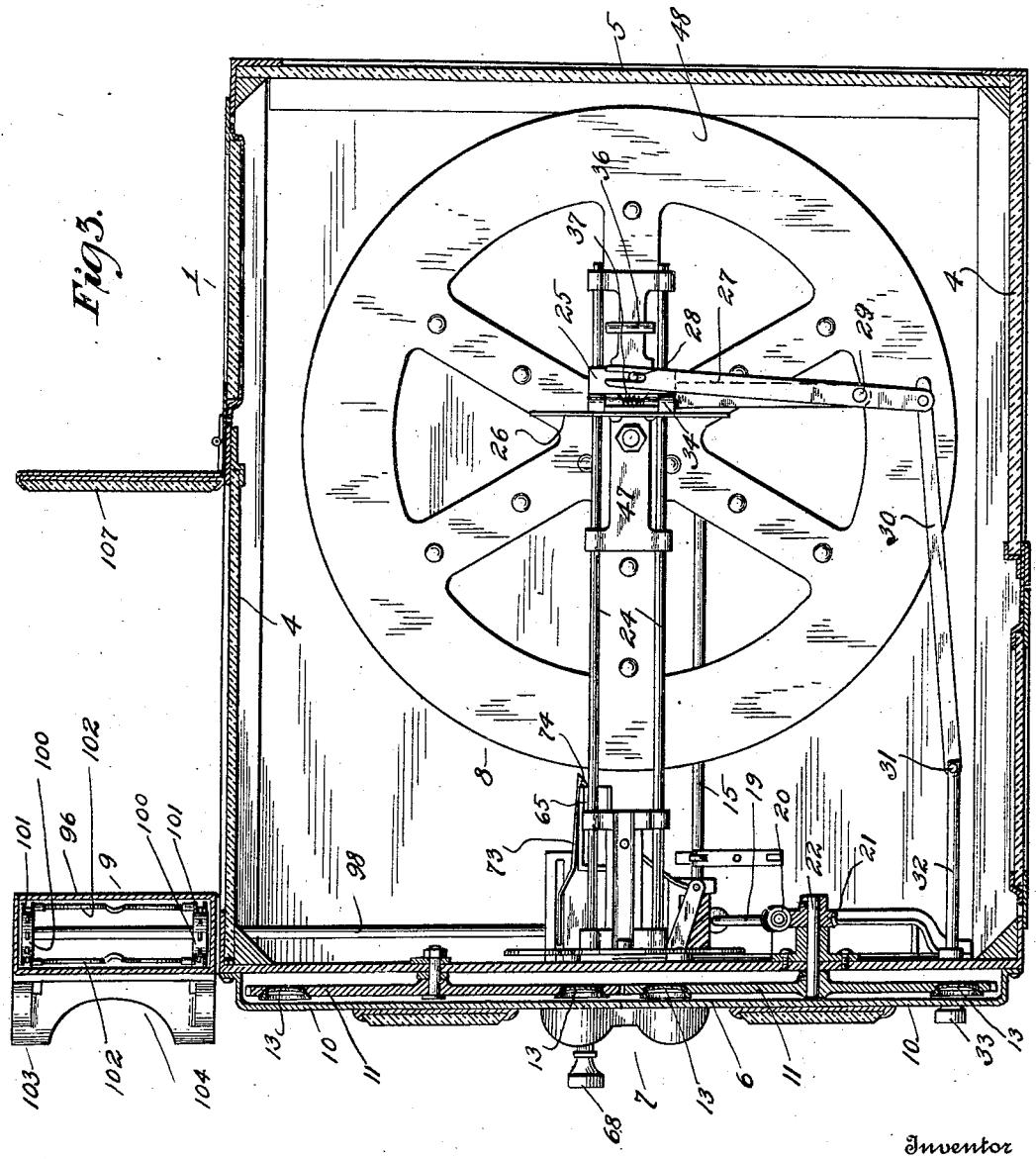
Figure 3 is a horizontal sectional view taken along the line 3—3 of Figure 2.
Figure 4:
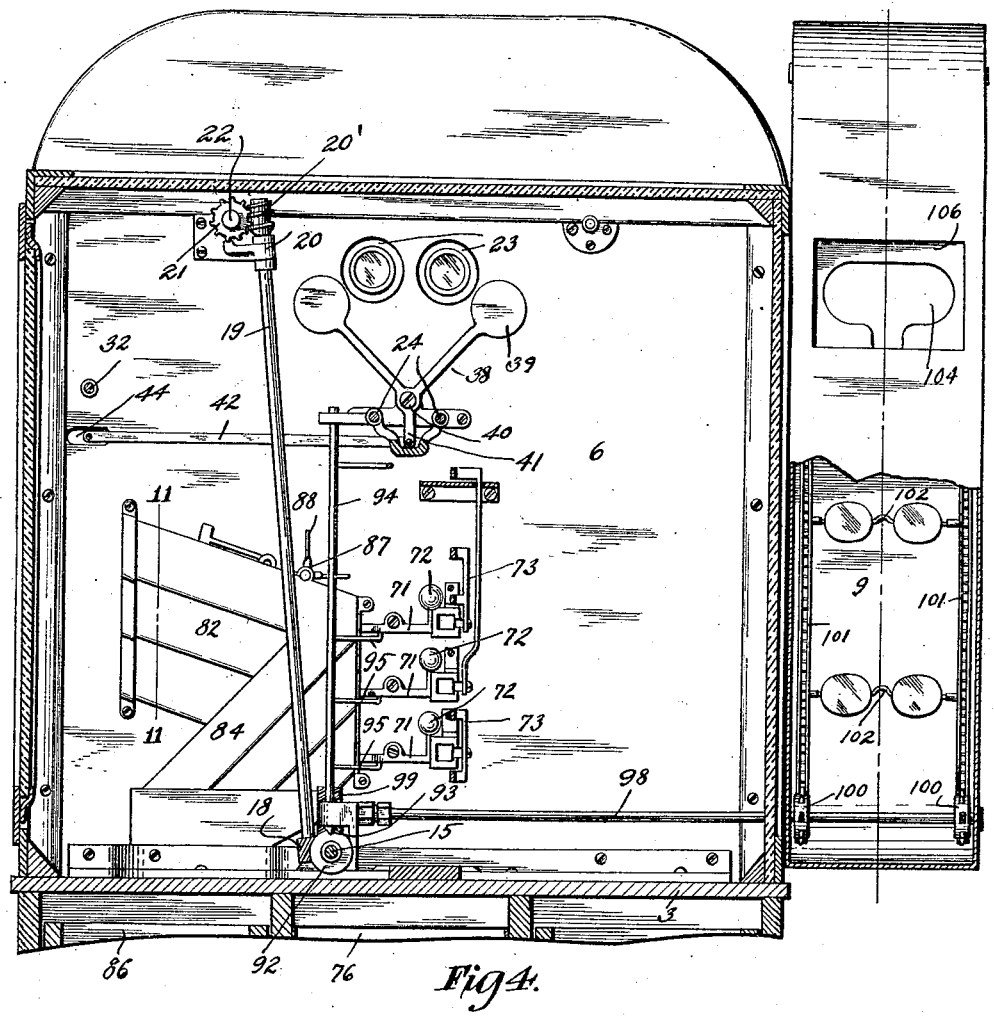
Figure 4 is a vertical sectional view taken along the line 4—4 of Figure 2 and illustrating more particularly the construction of the coin operated mechanism.

In order that the patron my judge the optical value of the varied lenses, which may be presented to his view, the said cabinet is fitted interiorly with a pair of horizontally extending rods 24, upon which is slidably mounted a carriage 25, the latter, as shown in Figure 3, is provided with a card or plate 26 upon which suitable eye testing indicia may be provided, such for example as lettering in print of varying proportions, or the usual parallel and crossing bars, common to all opticians' testing cards. The carriage 25 is adjustable longitudinally to varying focal lengths, and this is accomplished by the provision of a horizontally pivoted lever 27, which has one end thereof bifurcated to receive a fixed pin 28 projecting unwardly from the carriage 25. The lever 27 is pivoted as at 29 intermediately of its length, and has its outer end pivotally connected with the rear end of a link 30, the latter having its forward end pivoted as at 31 to a push rod 32, which is mounted for horizontal movement within the cabinet of the machine, the outer end thereof being equipped with a knob 33 which enables the same to be conveniently grasped and pulled back and forth. Apparently, this construction will enable the carriage 25 and consequently the card 26 to be longitudinally adjusted upon the rods 24, and to thereby enable the patron to test the power and refractory properties of the lenses within the disks 11.

For distance testing, the card 26 is removed from the line of vision, in order that the patron may have a clear vision through the walls of the cabinet and to enable a testing card situated beyond the cabinet to be viewed. Thus, to automatically remove the card from the line of vision, the same is pivotally mounted as at 34 upon the carriage 25, and is formed to include a depending finger 35, which is adapted when the card has been adjusted to an extreme position, to engage with a fixed abutment 36, whereby the finger 35 will be oscillated so as to rock the testing card downwardly and out of the line of vision, a spring or weight 37 being employed for normally returing the testing card to its upright position, after the finger 35 has been removed from engagement with the abutment 36. Also, it is frequently desirable to test each eye singly or separately. This may be done by providing the rear face of the wall 6 with a shutter structure 38, the latter consisting of a Y shaped member having enlarged ends 39, the arms thereof being pivoted, as at 40. A crank arm 41 is provided in connection with the shutter structure and is connected with a horizontally extending link 42, the latter having its other end connected with a knob 43, which is mounted for sliding movement within a slot 44 provided in the wall 6. It will be apparent that by this construction, the knob 43 may be moved either to the right or left, and as a result the link 42 will be reciprocated so that when the knob assumes either of its extreme positions within the slot 44, one of the enlarged ends 39 of the said shutter structure will be in alignment with one of the sight openings provided in the wall 6, so that the sight opening covered by the said end will have vision unobscured. Thus, either of the sight openings in the wall may be selectively covered to permit each eye to be separately tested, or when the knob assumes a mean position within the slot 44, unobstructed vision may be obtained through both of the said sight openings.

Figure 12:
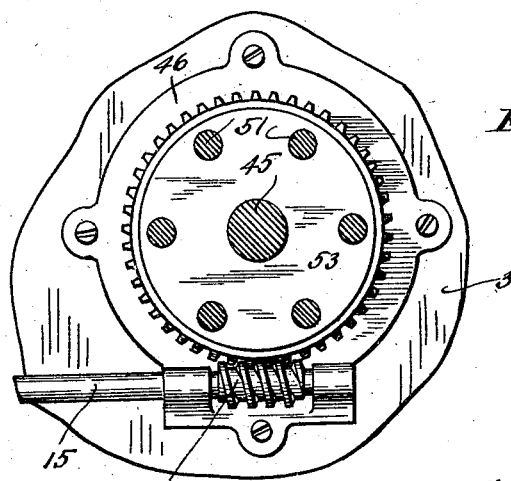
Figure 12 is a detail view of the gearing for rotating the carrier.

After the proper lenses have been selected, the next step in the operation of the machine is to withdraw a pair of such selected lenses embodied in eye glasses from the machine, and this function is accomplished through the instrumentality of the vending mechanism 8. This vending mechanism in this instance is formed to include a vertically extending shaft 45, which extends upwardly from a bearing 46 provided upon the base 3, and is adapted to be stationarily connected in conjunction with the bearing, the upper end if the said shaft 45 being provided with a bracket 47, which serves to secure and hold the spaced rods 24, and to provide limits within which the carriage 25 may be reciprocated, the said bracket 47 in this instance serving to provide a mounting for the abutment 36. Adapted to rotate axially about the shaft 45 is a rotatable merchandise carrier 48 which consists of a skeleton construction comprising horizontally disposed and vertically spaced plates 49, which are maintained in their spaced positions by means of sleeves 50 disposed around vertically extending tie rods 51 which pass vertically through the plates at intervals, the said rods being provided with nuts 52 upon their lower ends, which serve to maintain the parts of the carrier in rigidly assembled relationship and provide a construction which will be at once light in weight and yet rigid and substantial throughout. The lower of the plates 49 is equipped with a fixed worm gear 53, which is disposed to loosely surround the shaft 45, and to rotate upon antifriction bearings 54 provided in a raceway 55. The presence of the bearings 54 serves to permit the carrier to rotate freely about its axis. The upper of the plates 49 is provided with a fixed collar 56, which loosely surrounds the shaft 45 and engages with a collar 57 fixed upon the shaft, antifriction bearings may be provided between these collars if desired. The gear 53, as shown in Figure 12, meshes with a worm 58, which is carried upon the inner end of the shaft 15, and by this construction it will be manifest that when the eye testing mechanism 7 is operated, the carrier will be rotated and adjusted simultaneously therewith.

Figure 7:
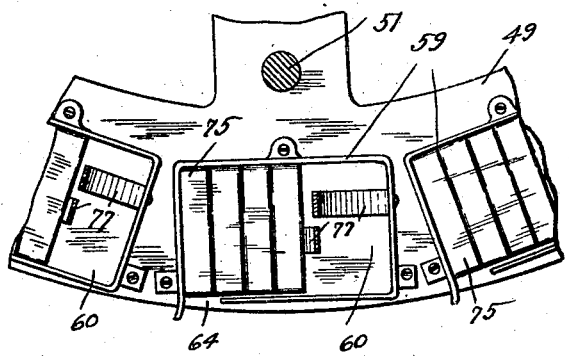
Figure 7 is a detail plan view of the rotatable carrier and illustrating more particularly the construction of the merchandise receiving compartments thereof.
Figure 8:
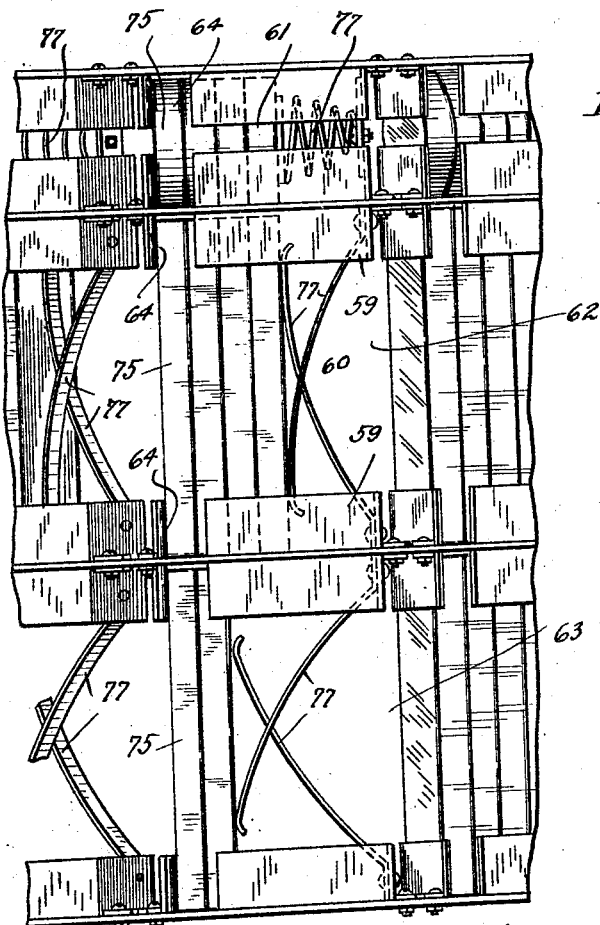
Figure 8 is a fragmentary side elevation of the carrier.

Mounted upon the carrier plates 49 are fixed cleats 59, which are so disposed, as shown in Figures 7 and 8, to constitute a plurality of compartments 60 around the circumference of the carrier, said compartments being adapted to contain a plurality of boxes or other containers of ascertained measurement in which the various products dispensed by the machine are adapted to be contained. Thus, certain of the compartments will be provided with boxes in which spectacles are inserted, other compartments will be provided with boxes containing merely the lenses, and without frames, while another set of compartments will receive boxes in which eye or nose glasses will be received, and by suitable mechanism hereinafter described, the desired products may be removed from the machine. In the form of the invention disclosed, the carrier includes superimposed tiers 61, 62 and 63 of compartments, the first or upper of which being of a size to receive the lenses, the second of the size to receive the spectacles and the bottom tier of compartments being adapted to receive the eye or nose glasses. The compartments for each tier preferably correspond in number to the number of lenses mounted in each of the disks 11, and therefore it will be apparent that lenses may be selected from any of said compartments which will be duplicates of the lenses positioned within the testing disks. Also, by gearing the disks 11 and the carrier to rotate in unison, the machine will operate so as to position the discharge openings 64 of each of the compartments in registration with the discharge chute 65 of the machine when the various lenses within the disk are properly brought into registration with the eye openings 14 and 23. Thus, the lenses selected through the testing mechanism will have the duplicates thereof positioned for discharge into the chute 25 upon completion of the testing operation. This structure is an improvement over the machines described in my aforesaid patents, in that the carrier disclosed by said patents was operated by a separate actuating device than the eye testing disk, and as a consequence the said mechanisms did not afford the facility and convenience in operation as may be had by the construction described and forming the present invention.

From the foregoing it will be seen that when a pair of lenses have been selected by the patron, the carrier will be properly aligned to discharge its products into the chute 65. It now remains to discuss the construction and operation of the mechanism for effecting the withdrawal of the products from the compartments 60 and to discharge the same from the machine upon the insertion of a proper coin or coins. This is preferably accomplished by the provision of a plurality of plungers 66, which are slidably mounted within bearings 67 provided for their support in conjunction with the front wall 6, the said plungers having their outer ends equipped with knobs 68, which admit of their manual manipulation, the outer faces of said knobs being suitably labeled so as to indicate the character of the merchandise which they will serve to eject from the machine. Thus, the separate plungers are provided for effecting the withdrawal of the lenses, the spectacles and the nose glasses, and these plungers may, therefore, be selectively actuated to withdraw the desired product. As shown in Figures 5 and 6, each plunger consists of an elongated shank in the side wall of which is provided a recess 69 which terminates in a beveled wall 70. Arranged normally to be seated within the lower part of the recess 69 of each plunger is a pivoted locking detent 71 which is provided with a weight 72 that normally serves to hold the detent within the recess 69. When this relationship of parts exists, it will be manifest that inward movement on the part of said plungers will be prevented, however, when the detent has its inner end raised a sufficient distance so as to be in registration with the beveled wall 70, the plunger may be moved inwardly without having the movement thereof obstructed by the detents, and the elevation of the detents to their unlocking positions is effected by the insertion of proper coins into the machine in a manner to be hereinafter more fully described. The inner ends of each of the plungers are equipped with inwardly extending resilient fingers 73, which have hooks 74 formed on the ends thereof. These hooks are capable of entering the entrances 64 to said openings when the plungers are inwardly actuated, and to be moved to a sufficient distance within said compartments so that the hooked end 74 thereof will engage with the rear edge portion of the boxes 75 positioned within the compartments, whereby upon the withdrawal or outward movement of any one of the plungers, the hooked end 74 of the fingers thereof will, by engaging with the boxes, draw the latter outwardly of the compartments and discharge the same into the chute 65, down which the boxes will be permitted to gravitate into a pocket 76 formed at the end thereof, and said pocket being in open communication with the front of the machine, will permit of the removal of the discharged box. The boxes are automatically fed within the compartments by means of springs 77 toward the entrance 64 thereof and hence the same will be normally capable of registering with said entrance so as to permit of the aforesaid operation of the plungers 66 and their associated fingers. To prevent withdrawal of the plungers after inward movement thereof has been initiated, the same are provided with depressions 78 in their upper faces, in which spring pressed dogs 79 are adapted to be normally received. Also, the upper surfaces of the plungers are provided with teeth 80, whereby when any one of the plungers has been forced inwardly, the dog 79 cooperative therewith will engage with the teeth 80, preventing retraction of the plunger, and in fact, to withdraw the latter it will be necessary that the same be forced inwardly to its fullest extent, in order that the dog 79 will be received within a second depression 81 located at the outer end of the teeth 80. Then, upon outward movement of the plunger, the dog 79 will be oscillated to a position which will not interfere with the outward movement on the part of the plunger.

Figure 11:
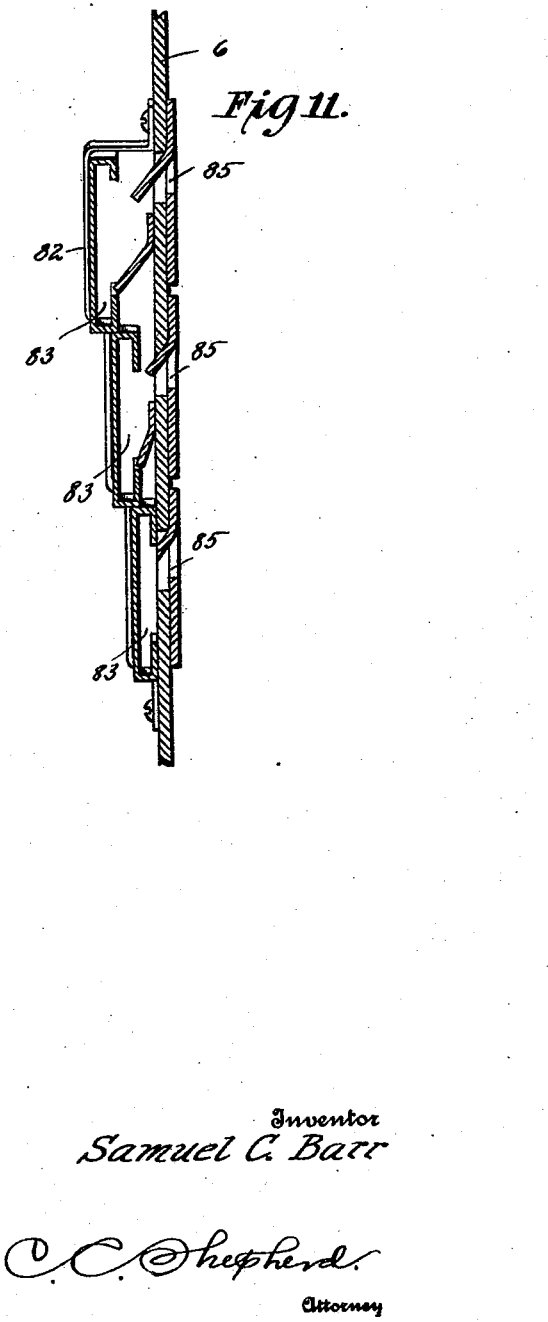
Figure 11 is a detail vertical sectional view taken through the coin chutes on the plane disclosed by the line 11—11 of Figure 4.
Figure 13:
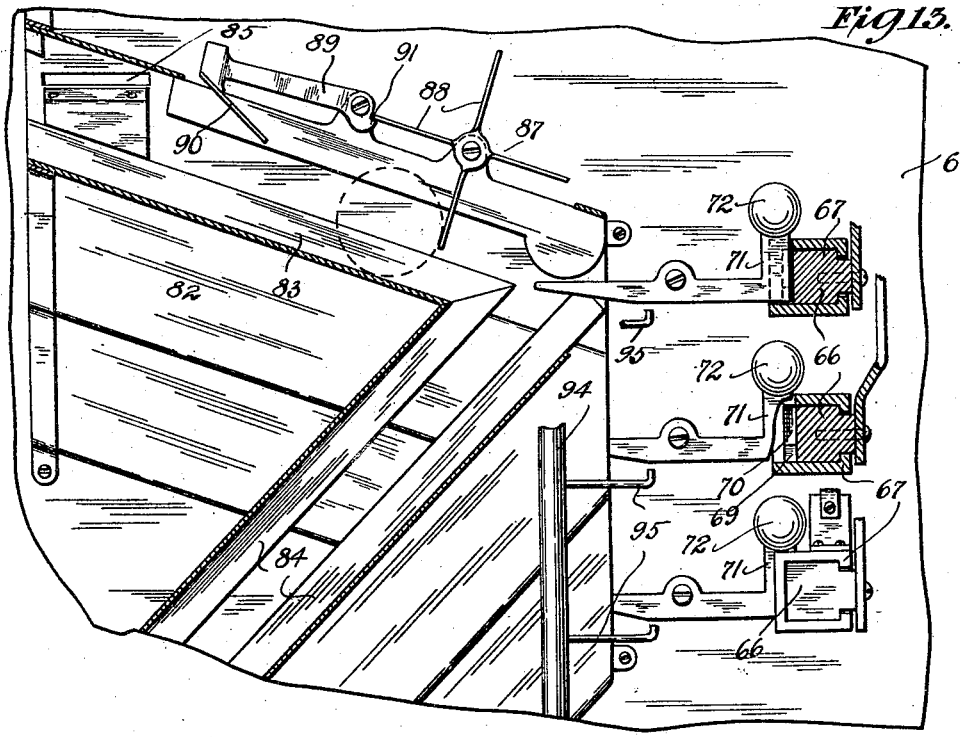
Figure 13 is an enlarged vertical sectional view taken through the coin chute and disclosing more particularly the mechanism for governing the operation of the plunger construction.

In order to effect the operation of the detents 71, so that the latter may be elevated to release the plunger 66, use is made of a metallic casing 82 in which a plurality of angular coin receiving guides 83 are provided, the lower ends of said guides communicating with other cooperating downwardly extending angular guides 84, the said guides 83 have their upper ends open, as shown in Figure 11, to receive coins deposited into the openings 85 provided in the front wall 6 for the reception of coins of proper denomination, and the arrangement is such that coins deposited through the openings 85 will be received in the upper ends of the guides 83 and then caused to gravitate in a controlled manner downwardly into the guides 84 and thence into an underlying money container 86. As shown in Figure 13, each coin chute is provided with a rotatable arresting member 87, which includes radial arms 88 disposed to extend into the upper guides 83. Normally rotation on the part of the members 87 is arrested by the provision of a plurality of pivoted pawls 89, which include cam surfaces 90 and offset shoulders 91. When the machine is placed into operation, a coin of proper denomination is inserted into each of the guides 83, and this coin is caused to gravitate into engagement with one of the arms 88 of the member 87 in the guide in which the coin is placed. Then, when a purchaser places a coin within the guide 83, the same will roll into engagement with the cam surface 90 of one of the pawls 89, causing the latter to be elevated so that the shoulder 91 thereof will be withdrawn from engagement with one of the arms of the arresting members, this permits the coin already in engagement with the said member to roll downwardly of the guide 83 by rotating the release member 87, however, when the coin last positioned within the guide 83 is released from engagement with the cam surface 90, the said pawl 89 will assume its normal position, locking further movement of the member 87, thus checking the descent of the last coin positioned within the guide and enabling the same to be held for effecting the operation of the apparatus upon the insertion of a subsequent coil. It will thus be seen that the members 87 situated within each of the slots or guides 83 will serve to arrest sharp downward movement of the coin inserted, but will operate to allow a released coin to engage properly and gently with the arm of the detent 71 projecting into the coin slot or slots 83. Thus, the released coin, by reason of its weight will effect the oscillation of the particular detent with which it engages, and thereby will lift the other end of said detent out of the recess 69 to permit one of the plungers 66 to be reciprocated. Then, when the beveled surface or walls 70 of the recess engages with the detent, the latter will be further rocked against the influence of its weight 72 so that the coin in engagement with the detent will be permitted to gravitate into the discharge guide 84 and deposited within the container 86. The plungers may then be operated as above stated to effect the withdrawal of the selected goods.

In order to prevent the operation of the plunger 66 when the discharge openings 64 of the compartment 60 are out of registration with the chute 65, I provide the shaft 15 with an eccentric 92, in which a peripheral depression 93 is provided. This depression is adapted to receive the lower end of a vertically movable non-rotatable rod 94 from which spring fingers 95 project, the said fingers being adapted to underlie the detents 71. It will be manifest that in the event that the compartment outlets are not in registration with the chute 65, the rod 94 will be elevated by reason of its engagement with the periphery of the eccentric 92. This forces the fingers 95 to a position immediately beneath or in engagement with the detents 71, thereby preventing the latter from being actuated if a coin is deposited thereon. This construction automatically serves to prevent the plungers from being operated when the carrier 48 is not in a proper position to discharge merchandise. However, when the openings 64 are in registration with the chute 65, the rods 64 will drop into the depression 93 and will thus be out of engagement with the detent 71, permitting the latter to be actuated in the manner previously set forth. Also, by reason of the depression 93, the operator of the machine will be notified when the machine is in position to effect the operation of the vending mechanism. It will be understood that the gearing ratio is such that the shaft 15 will make one complete revolution when the disks 11 have been rotated to bring a succeeding pair of lenses into registration with the sight openings 14, or to permit of succeeding openings 64 to be aligned with the chute 65. Thus, by the coin controlled mechanism, the products or merchandise contained within the different tiers of compartments may be selectively withdrawn and the merchandise delivered will properly accord with the lenses positioned in registration with the sight openings.

Figure 14:
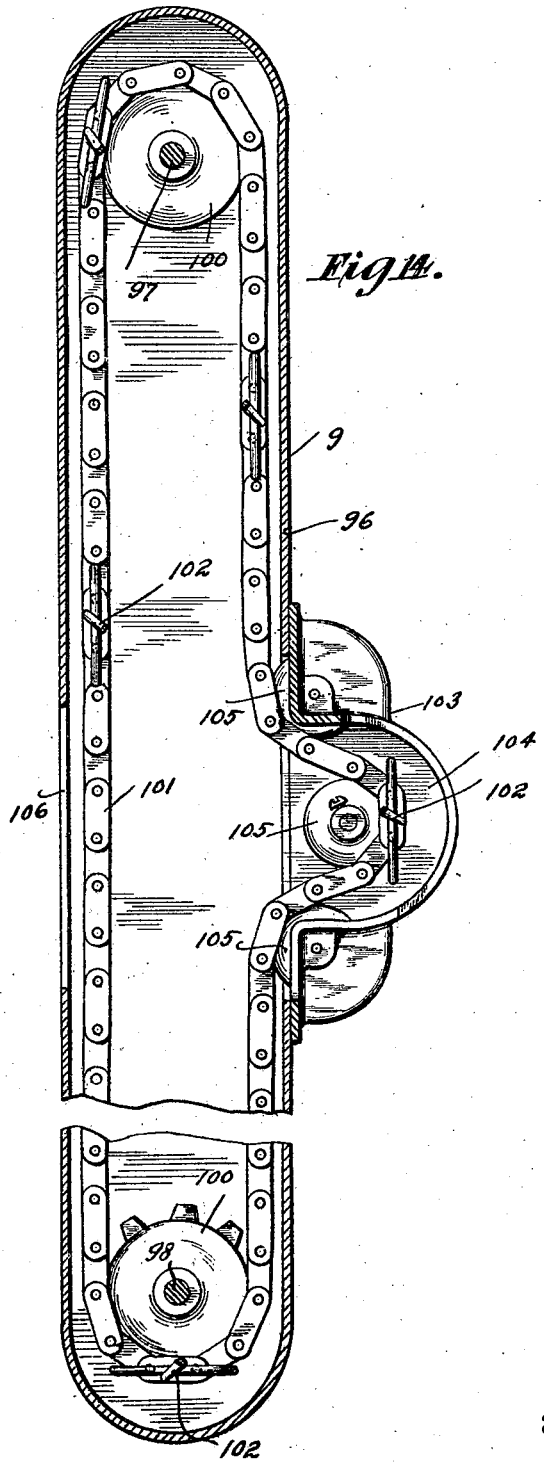
Figure 14 is a detail vertical sectional view taken through the frame testing mechanism.

In conjunction with the above, the vending machine further includes the frame testing mechanism 9. This mechanism is located to one side of the compartment 2, and comprises, as shown in Figure 14, a casing 96, suitably supported and provided with upper and lower shafts 97 and 98 respectively, the lower shaft being disposed to extend through the cabinet 2 and to have its inner end provided with a worm gear 99, which is disposed to mesh with the gear provided upon the shaft 15 for effecting the operation of the shaft 19, in order that upon the rotation of the shaft 15 motion will be simultaneously imparted to the shaft 98. The shafts 97 and 98 are equipped with fixed sprockets 100 over which spaced chains 101 are trained, the said chains being adapted to carry between them a plurality of spectacle frames 102 of different peculiarities of construction. The casing 96 is provided intermediately of its length with an outwardly extending semicircular plate 103, in which a face receiving opening 104 is provided, the said plate carrying rotatable guides 105, around which the chains 101 are trained, in order that the spectacle frames carried by said chains will be moved outwardly from the casing 96 and positioned in the opening 104 provided in the plate 103, and by this construction to facilitate the fitting of the frames by enabling the same to be readily and accessibly positioned for fitting. If desired, the rear wall of the casing 96 may be provided with an opening 106, which is backed by means of a mirror 107, the latter being attached to the side wall of the compartment 2 and so positioned as to permit a patron to view the appearance of the glass frame which he is testing. It will thus be seen that the carrier will be rotated in unison with the frame testing mechanism, and will be in a discharging position, to discharge the frames selected, when the latter is positioned within the opening 104.

In view of the foregoing description, taken in conjunction with the accompanying drawings, it will be apparent that the present invention provides a vending machine which will be particularly adapted for self service in dispensing of optical appliances. The machine affords a variety of tests, and enables the patron to carefully and exhaustively test his eyes and to then secure a pair of glasses best adapted for his individual requirements. The machine eliminates the services of a skilled optician, and in fact the machine is solely operated by the patron without involving any extraneous service. This enables the machine to be placed in public positions and to dispense its commodities without requiring unnecessary clerical attention, other than that which is necessarily involved in replenishing the stock within the carrier compartments. The machine is simple, substantial and efficient in construction, and by reason of the absence of delicate parts, the same will withstand the more or less severe usage to which it is subjected in actual use without requiring undue attention or repairs. It is believed that in view of the foregoing, the operation, construction and principles involved will be clearly understood by those versed in the art, therefore a more detailed explanation has been accordingly omitted.

What is claimed is:

1. In a vending machine for optical appliances, a cabinet, eye testing and vending mechanisms sustained by said cabinet, and a common actuating device for simultaneously effecting the operation of said mechanisms.

2. In a vending machine for optical appliances, a cabinet, an eye testing mechanism supported in connection with said cabinet, a vending mechanism mounted in connection with said cabinet, and an operating structure for effecting the simultaneous operation of said mechanisms and to maintain uniformity in the relative positions thereof.

3. In a vending machine for optical appliances, a cabinet, an eye testing mechanism including a pair of rotatably mounted disks, lenses positioned within said disks and capable of being selectively moved to assume positions in registration with sight openings, a vending mechanism capable of containing articles conforming in quality to said lenses, and means for simultaneously operating said eye testing and vending mechanisms whereby materials discharged from said vending mechanism will conform with the lenses positioned in registration with said sight openings.

4. In a vending machine for optical appliances, a cabinet, an eye testing mechanism mounted in connection with said cabinet and comprising a pair of disks capable of rotating in unison, testing lenses positioned within said disks and operative upon the rotation of the latter to be brought into or out of registering relation with sight openings, a vending mechanism including a plurality of compartments, said compartments being each adapted to contain commodities corresponding in quality to the lenses in said disks, and means for simultaneously operating said eye testing and vending mechanisms, whereby the materials discharged from said compartments will be in conformity with the lenses positioned in registration with said sight openings.

5. In a vending machine for optical appliances, a cabinet, an eye testing mechanism supported in conjunction with said cabinet and including a pair of disks capable of rotating in unison, test lenses mounted in openings provided in said disks and capable of registering with sight openings provided in said cabinet, a vending mechanism capable of including commodities corresponding in character to said lenses, a discharge chute, and means for simultaneously operating said eye testing and vending mechanisms, whereby the commodities of said vending mechanism brought into registration with said chute will correspond to the lenses positioned in registration with said sight openings.

6. In a vending machine for optical appliances, a cabinet, eye testing, frame testing and vending mechanisms sustained by said cabinet and manually operating actuating means common to said mechanisms for effecting simultaneous and uniform operation thereof.

7. In a vending machine for optical appliances, a cabinet, eye testing, frame fitting and vending mechanisms sustained by said cabinet, said eye testing mechanism including a plurality of lenses mounted within rotatable testing disks and capable of being brought into and out of registration with sight openings, and manually operated means for simultaneously operating said mechanisms, whereby said vending mechanism will be positioned to effect the discharge of commodities corresponding to the lenses positioned in registration with said sight openings and of selected frames determined by the frame fitting mechanism.

8. In a vending machine for optical appliances, a cabient, a vending mechanism positoned within the cabinet, a frame fitting mechanism supported in conjunction with the cabinet, movable optical frames positioned within said frame fitting mechanism and capable of being brought into or out of registration with a testing opening, and means for simultaneously operating the frame fitting and vending mechanisms whereby the products discharged from said vending mechanism will conform with the frame positioned in registration with said opening.

In testimony whereof I affix my signature.

SAMUEL C. BARR.